United States Patent [19]

Morishita et al.

[11] Patent Number: 4,561,036
[45] Date of Patent: Dec. 24, 1985

[54] CHARGING GENERATOR CONTROLLING DEVICE

[75] Inventors: Mitsuharu Morishita; Shinichi Kouge, both of Hyogo, Japan

[73] Assignee: Mitsubishi Denki Kabushiki Kaisha, Tokyo, Japan

[21] Appl. No.: 611,286

[22] Filed: May 17, 1984

[30] Foreign Application Priority Data

May 26, 1983 [JP] Japan ................................. 58-92681
May 26, 1983 [JP] Japan ................................. 58-92682

[51] Int. Cl.$^4$ ............................................. H02H 7/06
[52] U.S. Cl. .......................................... 361/20; 322/28
[58] Field of Search ............... 361/20, 21, 18; 322/25, 322/27, 28

[56] References Cited

U.S. PATENT DOCUMENTS

| 3,942,097 | 3/1976 | Itoh et al. | 361/18 X |
| 4,262,243 | 4/1981 | Mori et al. | 361/21 X |
| 4,435,676 | 3/1984 | Morishita | 322/28 X |
| 4,455,525 | 6/1984 | Morishita et al. | 322/28 |
| 4,471,287 | 9/1984 | Morishita et al. | 322/28 X |

*Primary Examiner*—Reinhard J. Eisenzopf
*Attorney, Agent, or Firm*—Sughrue, Mion, Zinn, Macpeak & Seas

[57] ABSTRACT

A charging generator controlling device including a protective circuit for protecting against excess current flow due to a short circuit. The device includes a charging generator, a rectifier, a battery, a voltage regulator circuit, a charge display lamp, a load and a current path switching device, as in a conventional device. The protective circuit includes an excess current detecting transistor coupled to be rendered conductive when the current flowing from the battery through the keyswitch to the field coil of the charging generator exceeds a predetermined value, in which case current is supplied from the battery through the keyswitch to a capacitor connected in a discharge loop. A comparator generates an output which drives a current switching device to energize the charge display lamp instead of the load and render a transistor series-connected with the field coil nonconductive during a predetermined period when the voltage across the capacitor exceeds a predetermined value.

2 Claims, 8 Drawing Figures

OSCILLATION OUTPUT

INITIAL FIELD CURRENT 4,561,036

CHARGING GENERATOR CONTROLLING DEVICE

BACKGROUND OF THE INVENTION

The present invention relates to a charging generator controlling device which includes a voltage regulator for maintaining an output voltage of a conventional charging generator (alternator) at a predetermined value, and a current path switching circuit for switching current paths to a display lamp and a load in response to the output voltage of the charging generator, and including especially a protective circuit to protect the device from an excess current flow due to a short circuit.

First, a charging generator of the prior art will be described with reference to FIG. 1. In FIG. 1, reference numeral 1 designates a three-phase AC generator, which may be mounted on a vehicle (not shown) and which is driven by an engine (not shown). The AC generator includes three-phase star-connected armature coils 101 and a field coil 102. In FIG. 1, reference numeral 2 designates a full-wave bridge rectifier for full-wave rectifying the AC output of the generator 1, reference numerals 201 and 202 designate an output terminal of the rectifier and a ground terminal, respectively, and 3, a voltage regulator which controls the field current of the field coil 102 to maintain the output voltage of the generator 1 at a first predetermined value.

The voltage regulator 3 includes, as shown in FIG. 1, a surge absorbing diode 301 connected between the terminals of the field coil 102, Darlington-connected output transistors 302 and 303 for selectively interrupting the current in the field coil 102, a resistor 304 supplying base current for the transistors 302 and 303, a control transistor 305 for turning on and off the transistors 302 and 303, a Zener diode 306 used to detect an output voltage at the rectifier output terminal 201 of the generator 1 and which is rendered conductive when the output voltage reaches the first predetermined value, and resistors 307 and 308 connected in series to form a voltage divider circuit which divides the voltage at the rectifier output terminal 201. Further in FIG. 1, reference numeral 4 designates a battery, 5 a keyswitch, 6 a charge display lamp, 7 a load, and 8 a current path switching circuit.

The current path switching circuit 8 includes a first pair of switching transistors 801 and 802 connected in Darlington fashion for energizing the charge display lamp 6, a resistor 803 supplying base current for the transistors 801 and 802, a second pair of switching transistors 804 and 805 which are rendered conductive when the transistors 801 and 802 are nonconductive to thus energize the load 7, a resistor 806 which determines the base current of the transistor 805, a switching transistor 807 which is rendered conductive when the voltage at the rectifier output terminal 201 is lower than the first predetermined value but higher than a second predetermined value defining a power-generating state of the charging generator controlling device, a diode 808 which blocks current flow through the resistor 806 when the switching transistor 807 is nonconductive, a Zener diode 809 which is connected to the base of the switching transistor 807 and which is rendered conductive when the voltage at the rectifier output terminal 201 is higher than the second predetermined value, and a resistor 810 through which current flows to the Zener diode 809 when it is rendered conductive.

The operation of the above-described prior art device will now be described.

When the keyswitch 5 is closed to start the engine, a base current is supplied from the battery 4 through the keyswitch 5 and the resistor 304 to the transistors 302 and 303 to thus render the transistors 302 and 303 conductive. When the transistors 302 and 303 are rendered conductive, a field current is supplied from the battery 4 through the keyswitch 5, the field coil 102 and the transistors 302 and 303 so that a field magnetomotive force is generated.

Then, when the engine is started and the generator 1 is driven, AC outputs are induced in the armature coils 101 in a magnitude determined by the speed of rotation of the generator 1. The AC outputs thus induced are full-wave rectified by the full-wave bridge rectifier 2. If the output of the rectifier 2 is lower than the first predetermined value, the potential at the voltage dividing point of the divider circuit composed of the resistors 307 and 308 will be low, and therefore the Zener diode 306 will be maintained nonconductive and the field current will remain supplied.

The output voltage of the generator 1 increases with the speed of rotation. When the speed of rotation of the generator 1 increases to the point where the output voltage becomes higher than the first predetermined value, the potential at the voltage dividing point of the divider circuit also increases until the Zener diode 306 is rendered conductive. Accordingly, base current is supplied through the Zener diode 306 to the transistor 305 to render the transistor 306 conductive. When the transistor 305 is conductive, the transistors 302 and 303 are rendered nonconductive. As a result, the current flowing to the field coil 102 is interrupted, whereupon the output voltage of the generator 1 decreases.

When the output voltage decreases to the first predetermined value, the Zener diode 306 and the transistor 305 are rendered nonconductive again. As a result, the field coil 102 is energized and the output voltage of the generator 1 again increases.

The above-described operation is repeatedly carried out to maintain the output voltage of the generator 1 at the first predetermined value. The output voltage thus controlled charges the battery 4.

The operation of the current path switching circuit 8 will now be described.

Just after the engine is started and the generator 1 is driven, the voltage at the rectifier output terminal 201 will be lower than the second predetermined value. Therefore, the Zener diode 809 and the switching transistor 807 will be rendered nonconductive. As a result, base currents of the second pair of switching transistors 804 and 805 are so small that the transistors 804 and 805 are rendered nonconductive. On the contrary, the base currents which are supplied to the first pair of switching transistors 801 and 802 are large enough to render the transistors 801 and 802 conductive.

When the transistors of the first pair of switching transistors 801 and 802 are conductive, the charge display lamp 6 is energized and turns on. On the contrary, when the output voltage of the generator 1 is controlled at the first predetermined value, which is higher than the second predetermined value, the Zener diode 809 and the switching transistor 807 are rendered conductive. Accordingly, the transistors of the first pair of switching transistors 801 and 802 are rendered nonconductive, and base current is drawn through the resistor 806 from the second pair of switching transistors 804 and 805 to thus render them conductive. As a result, the charge display lamp 6 is turned off and the load 7 energized instead through the second pair of switching transistors 804 and 805.

The above-described prior art device is accompanied by certain disadvantages. Particularly, if the connecting node A between the charge lamp 6 and the load 7 is grounded, under the condition that the output voltage of the generator 1 is controlled at the fist predetermined value so that the load 7 is energized through the second pair of switching transistors 804 and 805, an excess current will flow through the second pair of switching transistors 804 and 805 causing damage thereto.

Another prior art device is known which further includes a switching circuit connected between the voltage regulator 3 and the current path switching circuit 8 in FIG. 1. This switching circuit includes a switching transistor, main electrodes of which are connected to the line extending from the keyswitch 5 to the high voltage terminal of the field coil 102, and an oscillator for periodically driving the switching transistor. This switching circuit operates to control the initial current flowing through the field coil 102 when the keyswitch 5 is closed.

Such a prior art device is also accompanied by the same disadvantages as mentioned above. Moreover, such a prior art device is accompanied by another problem in that the switching transistor in line can be damaged by an excess current if the field coil 102 is shorted or the high voltage terminal thereof is grounded.

An object of the present invention is thus to provide a charging generator controlling device which includes a protective circuit which eliminates the above-described problems accompanying prior art devices.

SUMMARY OF THE INVENTION

Accordingly, the invention provides a charging generator controlling device including a protective circuit which interrupts an excess current flow to transistors of the device when predetermined circuit points in the device, such as the node between the charge display lamp and the load, are grounded.

The charging generator controlling device of the present invention includes a charging generator, rectifier mans, a battery, voltage regulator means, a charge display lamp, a load and current path switching means as in the conventional device. In addition, it includes a protective circuit having an excess current detecting transistor and a comparator. The excess current detecting transistor is rendered conductive when the current flowing from the battery through the keyswitch to the field coil of the charging generator exceeds a predetermined value, in which case current is supplied from the battery through the keyswitch to a capacitor having a discharge loop. The comparator, which has a hysteretic transfer characteristic, generates an output which drives the current path switching means to energize the charge display lamp instead of the load, and also renders an appropriate transistor series-connected with the field coil of the charging generator nonconductive during a predetermined period when the voltage across the capacitor exceeds a predetermined value.

DESCRIPTION OF THE PREFERRED EMBODIMENTS

Figure 1:
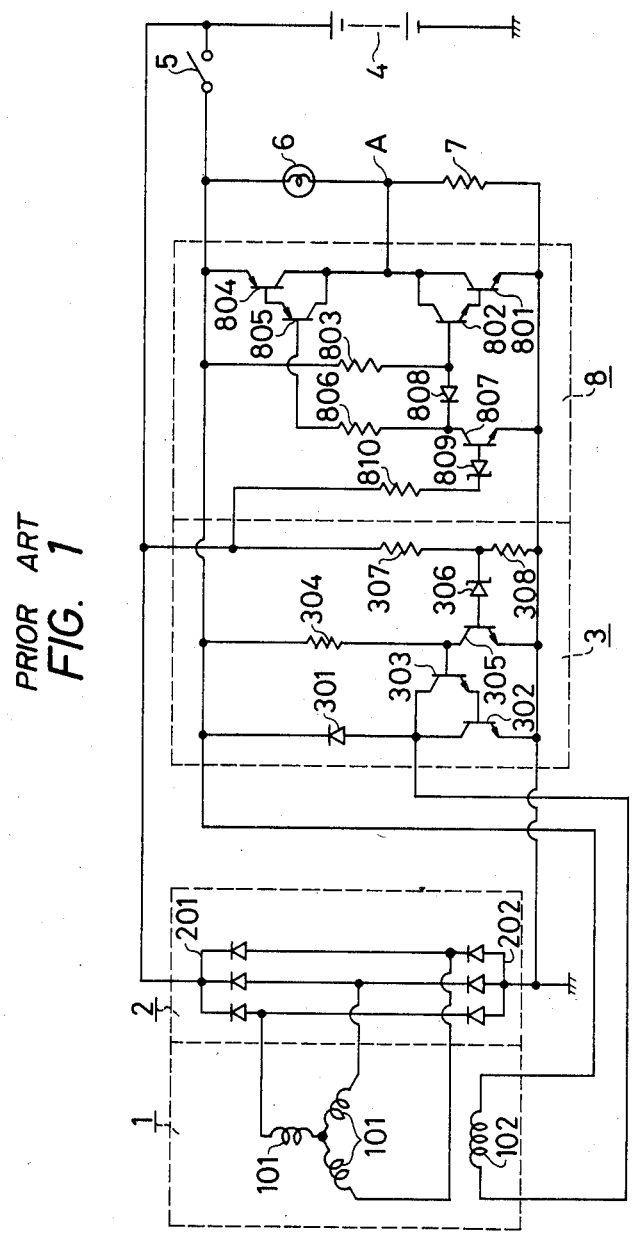
FIG. 1 is schematic diagram showing a prior art charging generator controlling circuit of the same general type to which the invention pertains.
Figure 2:
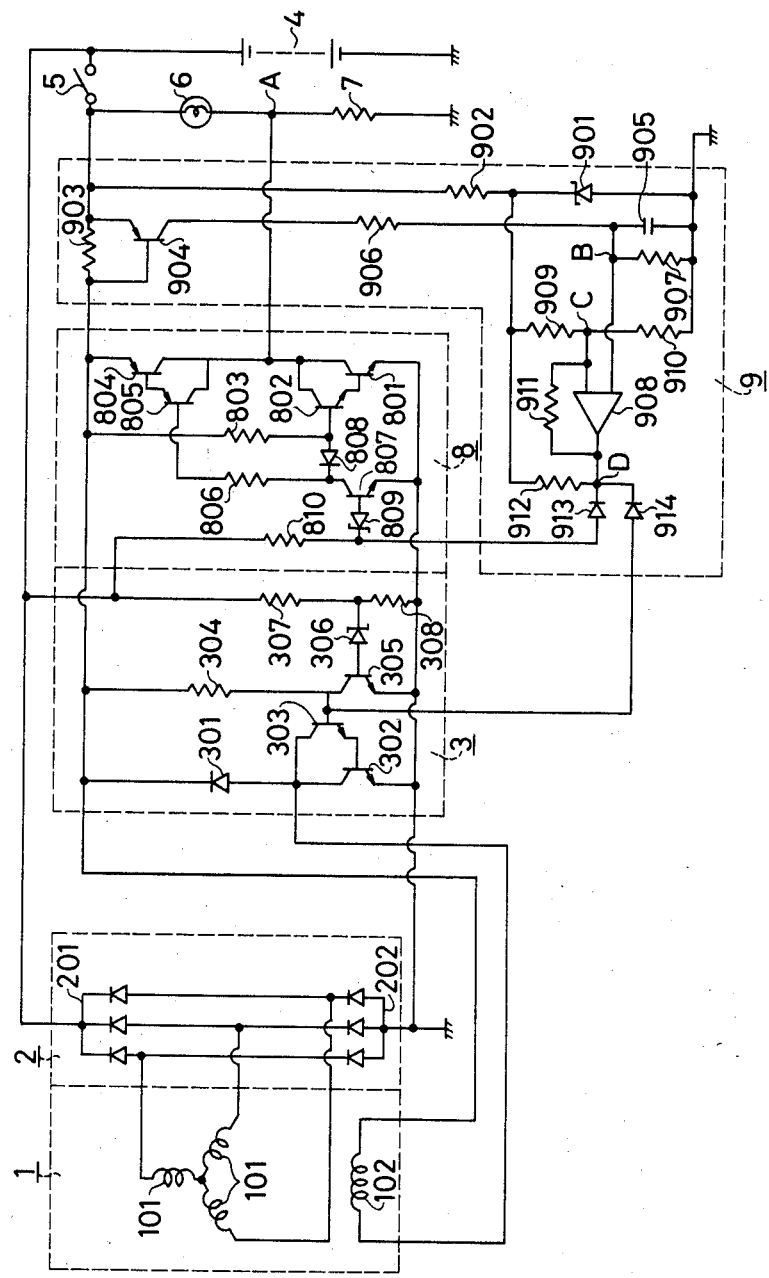
FIG. 2 is a schematic diagram of a first embodiment of a charging generator controlling device of the invention.

A first preferred embodiment of the invention is shown in FIG. 2. In this Figure, reference numerals used in common with FIG. 1 designate like components, and hence detailed descriptions thereof will be omitted.

In FIG. 2, reference numeral 9 designate a protective circuit. This protective circuit includes a Zener diode 901 which operates as a power source of the protective circuit 9, a resistor 902 which supplies a bias current to the Zener diode 901, a current detecting resistor 903 which detects a current flowing from the battery 4 through the keyswitch 5 to the current path switching circuit 8 and the field coil 102 of the generator 1, a transistor 904 which is rendered conductive to detect an excess current flowing through the resistor 903, a capacitor 905 which is charged through the transistor 904 when an excess current is present, a resistor 906 which determines the charging current to the capacitor 905, a resistor 907 for discharging the capacitor 905, a comparator 908 which generates a low voltage output when excess current is present, resistors 909, 910, 911 and 912 which provide the comparator 908 with a reference voltage to be compared with the charged voltage of the capacitor 905, a first diode 913 which renders the switching transistor 807 nonconductive when the output of the comparator 908 is low, and a second diode which renders the output transistors 302 and 303 nonconductive when the output of the comparator 908 is low.

The operation of the above-described protective circuit 9 will now be described in conjunction with that of the other portions of the device in FIG. 2.

Figure 3:
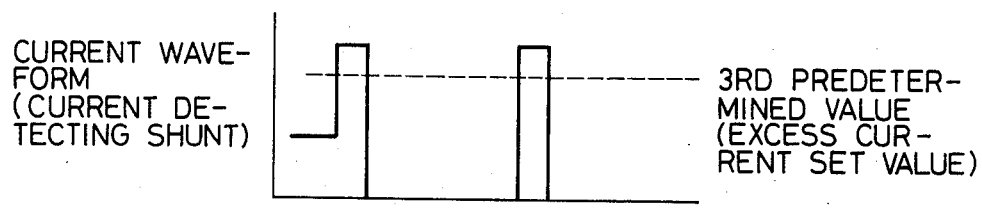
FIGS. 3, 4 and 5 are waveform diagrams used in explaining the operation of the charging generator controlling device of FIG. 2.
Figure 4:
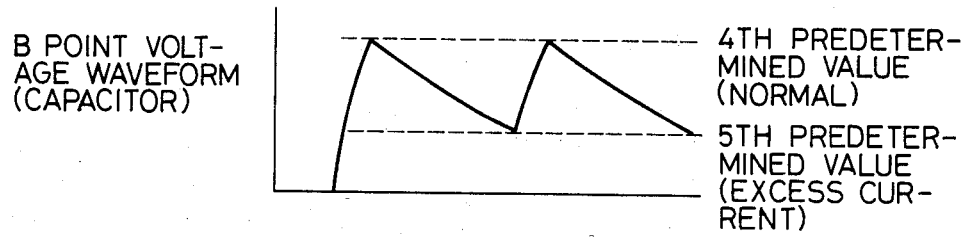
Figure 5:
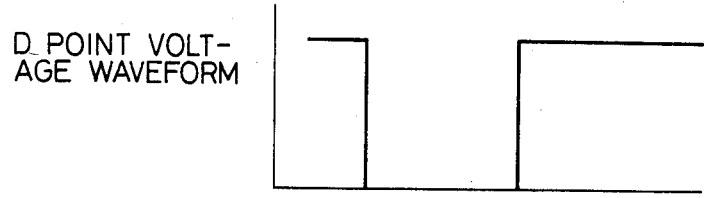

In FIG. 2, it is first assumed that the output voltage of the charging generator 1 is controlled at the first predetermined value so that the load 7 is energized through the second pair of switching transistors 804 and 805. Under this condition, if the connecting node A between the display lamp 6 and the load 7 is grounded directly or grounded through a certain resistance, or if the field coils 102 are short-circuited, an excess current will flow through the current detecting resistor 903. If the excess current exceeds a third predetermined value which defines a lower limit of the excess current, as shown in FIG. 3, the voltage drop across the current detecting resistor 903 becomes larger than the baseemitter voltage of the transistor 904 to render the transistor 904 conductive. As a result, as shown in FIG. 4, the capacitor 905 will be charged through the transistor 904 and the resistor 906. A voltage at a node C at the noninverting input terminal (+) of the comparator 908 is a fourth predetermined value under normal conditions. The fourth predetermined value is determined by the ratio of the resistance of the resistor 910 to the resistance of the combined resistor composed of the resistor 909 and the series connection of the resistors 911 and 912 connected in parallel. If the capacitor 905 is charged until the point that its voltage exceeds the fourth predetermined value, the voltage at a node D at the output terminal of the comparator 908 will be low, as shown in FIG. 5. As a result, the switching transistor 807 is rendered nonconductive due to the presence of the first diode 913, and the output transistors 302 and 303 also rendered nonconductive due to the presence of the second diode 914. When the switching transistor 807 becomes nonconductive, the base currents of the second pair of switching transistors 804 and 805 will be lost, rendering the transistors 804 and 805 nonconductive. Therefore the current through the current detecting resistor 903 will be cut off, and thereby the transistor 904 will be rendered nonconductive. As a result, as shown in FIG. 4, a capacitor 905 will begin to discharge through the resistor 907, which discharge is carried out slowly. At this time, since the output voltage of the comparator 908 remains low, the voltage at node C connected at the noninverting input terminal of the comparator 908 is held at a fifth predetermined value lower than the fourth predetermined value. The fifth predetermined value is determined by the resistance of the combined resistor composed of the parallel connection of the resistor 909 together with the series connection of the resistors 910 and 911. Therefore, the output voltage of the comparator 908 will remain low until the capacitor 905 is discharged to the point that its voltage is lower than the fifth predetermined value. When the voltage of the capacitor 905 is lower than the fifth predetermined value, the output voltage of the comparator 908 goes high again, as shown in FIG. 5. As a result, the second pair of switching transistors 804 and 805 and the output transistors 302 and 303 are again rendered conductive. If an excess current larger than the third predetermined value appears again, as shown in FIG. 3, the abovedescribed operation will be repeated.

According to the first embodiment of the present invention as described above, if an excess current larger than the third predetermined value flows the device due to a short circuit in the load 7 or in or between the field coils 102, the current flowing in the device will be interrupted during a predetermined period. Therefore, damage to the second pair of switching transistors 804 and 805 and the output transistors 302 and 303 is effectively avoided.

Figure 6:
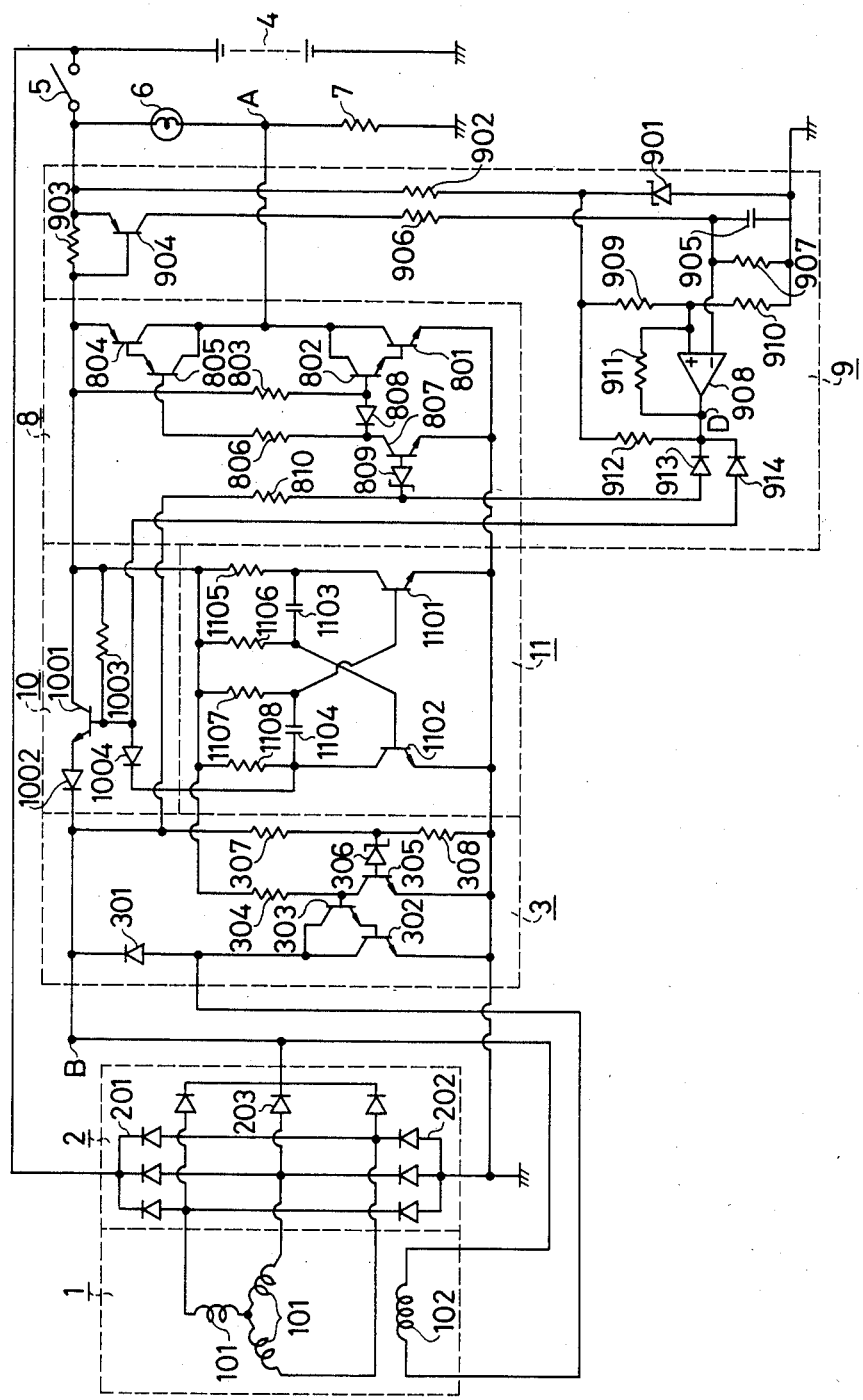
FIG. 6 is a schematic diagram of a second embodiment of a charging generator controlling device of the invention.

A second embodiment of a charging generator controlling device of the invention is shown in FIG. 6. In this Figure, reference numerals used in common with FIGS. 1 and 2 designate like components, and hence further detailed descriptions thereof will not be given.

The device of FIG. 6 differs from the device of FIG. 2 mainly in that it further includes a switching circuit 10 and oscillator circuit 11 for driving the switching circuit 10. The switching circuit 10 includes a switching transistor 1001 for selectively interrupting the initial field current when the keyswitch 5 is closed, a diode 1002 for blocking reverse current in the powergenerating state, a resistor 1003 which forms base circuit of the switching transistor 1001, and a diode 1004 which is connected to the oscillator 11 and drives the switching transistor 1001.

Figure 7:
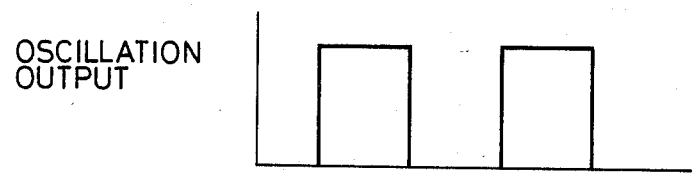
FIGS. 7 and 8 are waveform diagrams used in explaining the operation of the charging generator controlling device of FIG. 6.
Figure 8:
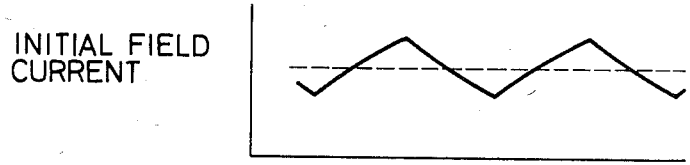

The switching circuit 10 operates to control the initial field current in the field coil 102. The cathode of the diode 1004 is connected to the output terminal of the oscillator circuit 11 to receive the output of periodic pulses as shown in FIG. 7. When the output of the oscillator circuit 11 goes high, the switching transistor 1001 will be rendered conductive to supply field current to the field coil 102. The field current increases linearly with time, as shown in FIG. 8, due to the inductance of the field coil 102. Thereafter, when the output of the oscillator circuit 11 goes low, the switching transistor 1001 is rendered nonconductive. Hence, the field current in the field coil 102 flows through the diode 301, decaying linearly with time as shown in FIG. 8. In this manner, a sawtooth waveform field current will flow through the field coil 102, the mean value of which is controlled by the oscillator circuit 11.

The construction of the protective circuit 9 of FIG. 6 is substantially the same as that of FIG. 2 except that the output terminal of the comparator 908 is not coupled to the base of the output transistors 302 and 303 through the second diode 914 but is coupled the base of the switching transistor 1001 through the second diode 914. In this arrangement, when the voltage of the capacitor 905 exceeds the fourth predetermined value to set low the output voltage of the comparator 908 as explained above with regard to FIG. 2, the base voltage of the switching transistor 1001 is pulled down to render the switching transistor 1001 nonconductive. At the same time, the transistors of the second pair of switching transistors 804 and 805 are rendered nonconductive due to the presence of the first diode 913 and the switching transistor 807, as is the case of the device of FIG. 2. The operation of other portions of the protective circuit 9 is the same as that of FIG. 2, and therefore a further description will not be given.

According to the second embodiment of the present invention as described above, if an excess current larger than the third predetermined value flows in the device due to a short circuit in the load 7 or in or between the field coils 102, the current flowing in the device will be interrupted during a predetermined period by rendering the second pair of transistors 804 and 805 of the current path switching circuit 8 and the switching transistor 1001 of the switching circuit 10 nonconductive. Therefore, damage of the second pair of switching transistors 804 and 805 and the switching transistor 1001 is effectively avoided. In the second embodiment, the output transistors 302 and 303 remain conductive after the excess current is detected. However, the excess current will not flow in these transistors since the field current is interrupted by the switching transistor 1001.

We claim

1. A charging generator controlling device comprising:
  (a) a charging generator having field and armature coils;
    rectifier means for rectifying AC outputs induced in said armature coils of said charging generator;
  (b) a battery coupled to an output provided at an output terminal of said rectifier means;
  (c) voltage regulator means including output transistor connected to said field coil of said charging generator in series between said battery and a ground terminal, said output transistor selectively interrupting a current in said field coil to maintain an output voltage of said generator at a predetermined value;

(d) a charge display lamp and a load connected in series, the series connection thereof being connected to a keyswitch in series between said battery and said ground terminal;

(e) current path switching means having an input coupled to an output of said charging generator and comprising first, second and third switching transistors, said first and second transistors being driven by said third transistor to energize said load instead of said charge display lamp when a potential at said output of said charging generator exceeds a second predetermined value lower than said first predetermined value; and (f) protective means comprising:
  (i) a capacitor connected in a discharge loop,
  (ii) a transistor connected to a current path between said battery and said field coil, said transistor being rendered conductive when a current flowing from said battery through said keyswitch to said field coil of said charging generator exceeds a first predetermined value to thereby supply a current from said battery through said keyswitch to said capacitor, and
  (iii) comparator means having an input coupled to said capacitor for generating an output for driving said third switching transistor of said current path switching means to energize said charge display lamp instead of said load and render said output transistor of said voltage regulator means nonconductive when the voltage of said capacitor exceeds a second predetermined value.

2. A charging generator controlling device comprising:

(a) a charging generator having field and armature coils;

(b) a rectifier means for rectifying AC outputs induced in said armature coils of said charging generator, said rectifier means having first and second rectifier output terminals and a ground terminal, said field coil being coupled to an output terminal of said rectifier means to be excited thereby;

(c) a battery coupled to an output provided at said first rectifier output terminal of said rectifier means;

(d) voltage regulator for controlling application of current to said field coil to maintain an output voltage of said generator at a first predetermined value;

(e) a switching unit comprising a switching transistor, main electrodes thereof being connected to a conductor extending between said keyswitch and said output terminal of said rectifier means, and an oscillator for periodically driving said switching transistor;

(f) a charge display lamp and a load connected in series, the series connection thereof being connected to a keyswitch in series between said battery and said ground terminal;

(g) a current path switching means having an input coupled to an output of said charging generator and comprising first, second and third switching transistors, said first and second transistors being driven by said third transistor to energize said load instead of said charge display lamp when an output of said charging generator exceeds a second predetermined value lower than said first predetermined value; and (h) a protective circuit comprising
  (i) a capacitor connected in a discharge loop,
  (ii) a transistor connected to a current path between said battery and said field coil, said transistor being rendered conductive when a current flowing from said battery through said keyswitch to said field coil of said charging generator exceeds a third predetermined value to thereby supply a current from said battery through said keyswitch to said capacitor,
  (iii) comparator means having an input coupled to said capacitor for generating an output for driving said third switching transistor of said current path switching means to energize said charge display lamp instead of said load and render said switching transistor of said switching unit nonconductive when the voltage of said capacitor exceeds a fourth predetermined value.

* * * * *